Dec. 16, 1958     E. H. BROOKS, SR     2,864,672
ORGANIC WASTE REDUCTION APPARATUS
Filed Dec. 28, 1953     2 Sheets-Sheet 1
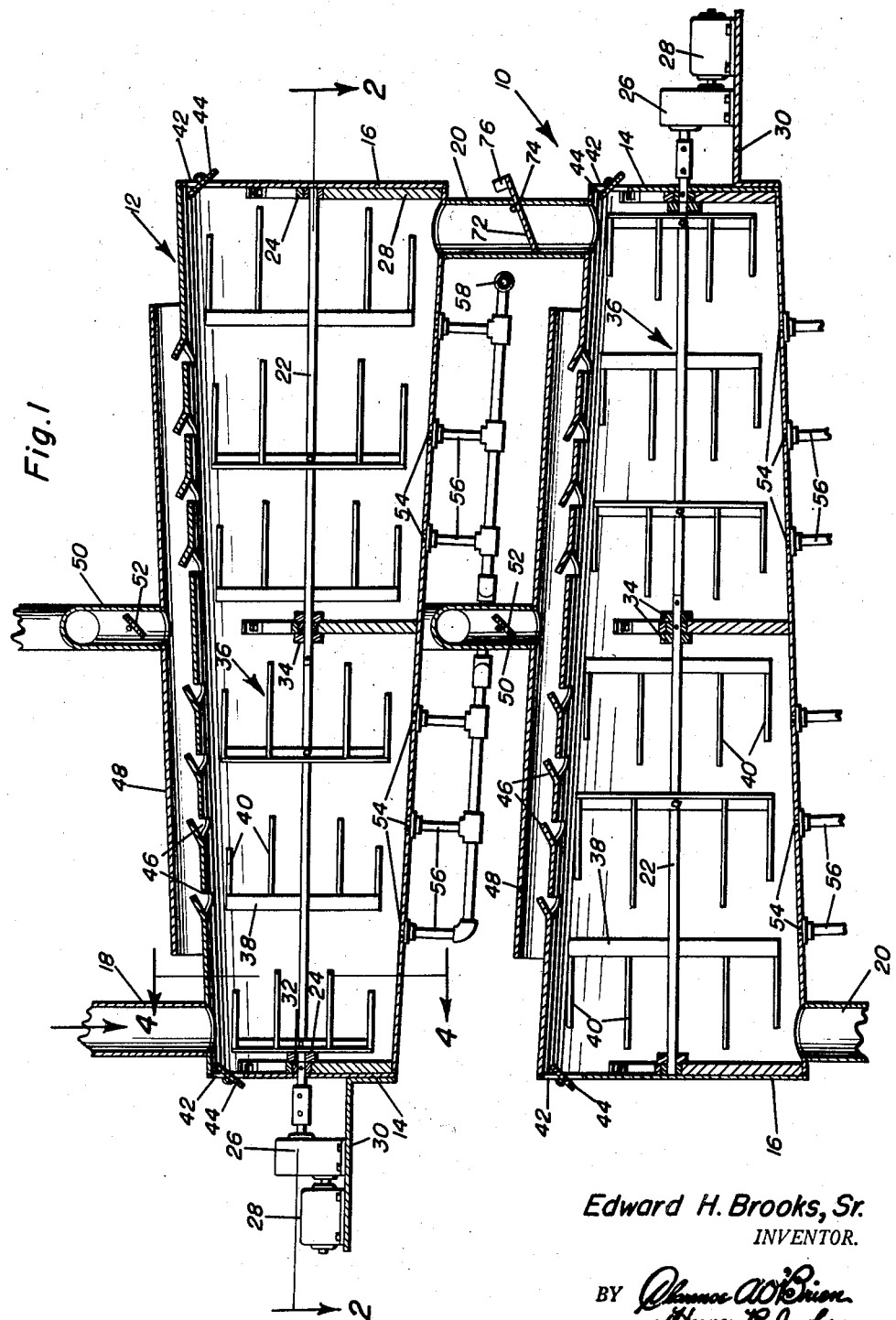
Edward H. Brooks, Sr.
INVENTOR.

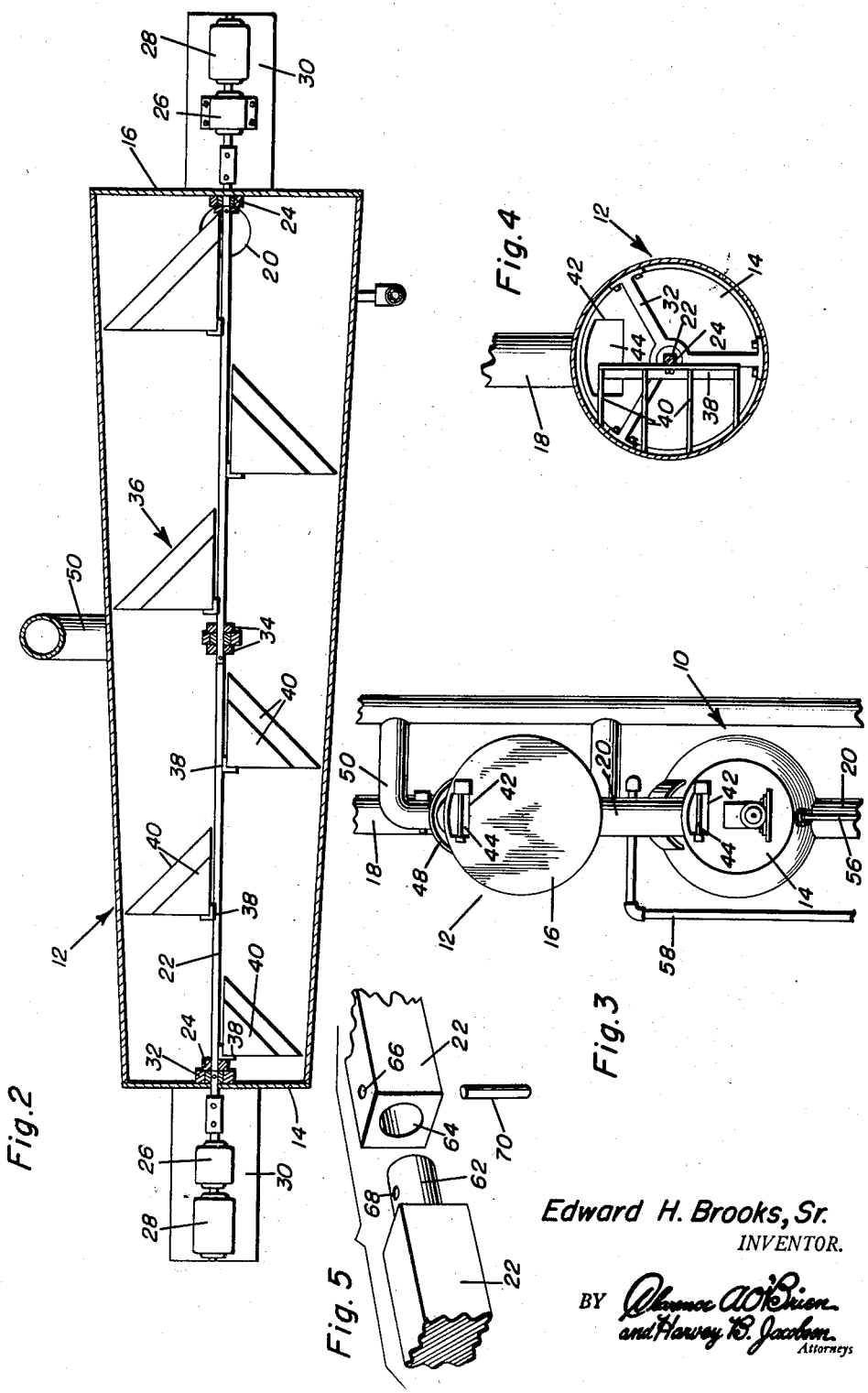

United States Patent Office 2,864,672
Patented Dec. 16, 1958

2,864,672
ORGANIC WASTE REDUCTION APPARATUS

Edward H. Brooks, Sr., Pownal, Maine, assignor of forty-nine percent to Edward H. Brooks, Jr., Pownal, Maine Application December 28, 1953, Serial No. 400,498

1 Claim. (Cl. 23—259.1)

The present invention relates to apparatus utilized in the reduction of organic waste materials such as sewage and garbage and more particularly relates to an organic waste digester to be utilized in the inoculation, pasteurization and drying of organic waste materials.

The primary object of the invention is to provide an organic waste digesting apparatus having greatly increased flexibility and capacity over presently used apparatus.

Another object of the invention is to provide an organic waste digester which consists of an elongated, frusto-conical drum which is horizontally disposed and which permits aeration of material with the drum from both ends thereof while enabling the withdrawal of the waste gases produced with the drum from a central portion thereof thereby permitting more flexibility in the aeration of the drum along with a more even exhaust flow of gases from the drum.

A still further object of the invention is to provide a drum of the above described character which permits the stock or material fed into the drum to be both agitated and lifted as it moves to the discharge end of the drum thereby facilitating the aeration of the stock as it passes through the drum.

A last object of the invention to be mentioned specifically is the provision of an organic waste reduction apparatus that is capable of great accuracy in heat control during the various states of inoculation, pasteurization and drying of the organic material being digested by the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the waste reduction apparatus with the digester drums being shown in cross section for clarity of detail.

Figure 2 is a horizontal section taken along section line 2—2 of Figure 1.

Figure 3 is an end view of the apparatus.

Figure 4 is a vertical section taken along section line 4—4 of Figure 1.

Figure 5 is an exploded perspective of the shaft section coupling.

At present, in bacterial reduction of organic waste to fertilizer, the Earp-Thomas waste digesters as shown in Patent No. 2,178,818 are utilized. The capacity of this type digester is however severely limited, their maximum capacity being in the neighborhood of twenty tons per day. Primarily, this type digester consists of an enlarged, vertically disposed cylindrical tank being divided into a plurality of vertically stacked compartments by means of baffle plates disposed within the tank. An axial shaft extends vertically through the tank and plows extend in cantilever fashion from the shaft in each compartment to scrape the stock from the compartment through the opening in the baffle plate down into the next compartment. The size of these digesters is effectively limited by the distance the plows may be cantilevered from the shaft. The present invention is primarily to an organic waste digester which eliminates this problem and which yet provides for a gravity feed of the organic waste material from one stage of the digesting operation to another.

In the drawings, each digester unit of the digesting apparatus 10 comprises an elongated, horizontally disposed, frusto-conical drum 12. The drum in essence consists of a tapered, tubular shell having suitable plates 14 and 16 closing the smaller and larger ends thereof respectively. Opening into the top of the drum adjacent the smaller end thereof is an organic waste material or stock entrance conduit 18 and leading from the bottom of the drum adjacent the larger end thereof is a stock discharge conduit 20.

Extending axially through the drum is a shaft 22, being preferably of polygonal cross section and being suitably journaled in the ends of the drum as by bearings 24. One end of the shaft 22 projects through one of the end walls of the drum, the smaller end wall 14 as shown in the drawings and is operably attached through the gear reduction unit 26 to a suitable motor 28 which apparatus may be in turn mounted on bracket 30 secured to the outer face of the smaller end wall of the drum. Where the length of the drum makes it necessary, intermediate spiders such as shown at 32 may rotatably support the intermediate portions of the shaft within the drum through the medium of bearings 34.

Axially spaced along the shaft 22 and being of increasing length from the smaller to the larger end of the drum are a plurality of plows 36. The function of these plows is to mix and agitate the stock while lifting the stock within the drum and moving it from the drum entrance at 18 to the drum exit 20. Although simply by the slope of the bottom of the drum from the entrance of the exit end of the drum, stock fed into the drum would flow naturally by gravity toward the exit, the speed of this flow may be obviously controlled by varying speed of the plows 36.

As will be noted in Figure 2 the plows 36 are formed by the angle members 38 secured intermediate their ends to opposite side walls of the square shaft 22 at longitudinally spaced points therealong and extending perpendicularly to either side of the shaft. Triangular blades or scoops 40 are secured at their right angularly related edges between the legs and the angle members 38 in such manner that one of the right angular edges of each triangle is parallel to the smaller end wall 14 of the drum while the hypotenusal edge of each triangle points toward the larger end 16 of the drum. Thus, as the plows 36 are rotated the plates 40 scoop up the stock from the bottom of the drum and lift it spirally to the top of the drum and again allow it to fall to the bottom of the drum while at all times pushing the material forwardly by the shape of these scoops. Although shown as flat plates, the scoops 40 may be dished to form buckets in effect or may be of other shapes to perform the same function.

Adjacent the upper end of each of the end walls 14 and 16 an opening 42 is provided. Damper 44 may likewise be mounted on the end wall to control the degree of opening of the openings 42. Blowers or the like, not shown, may be utilized to blow air into each of the openings 42 if necessary so that the drum is aerated from both ends toward the center thereof. With this arrangement, as the stock is lifted by the scoops 40 of the plow blades 38 it is efficiently and uniformly aerated.

Longitudinally spaced along the top of the wall of the drum are a plurality of vent openings 46. A hood 48 extending longitudinally along the top of the drum spacedly overlies the vent openings 46 and is provided with a central upwardly extending exhaust stack 50. The stack 50 acts like any chimney in creating a draft to withdraw exhaust or waste gases generated by the material moving through the drum. Damper 52 within the stack may be utilized to control the draft created thereby. As will be noted the stack 50 extends upwardly from the central portion of the drum whereby the draft through the vents 46 is created substantially equally throughout the length of the drum.

To drain the liquid stock from the drum, the bottom of the drum is provided with a plurality of openings 54 which open into the drain conduits 56 which lead to a suitable sump (not shown).

By this arrangement of each digester unit, the degree of extension of the plows is almost unlimited since no cantilever support of these members is required, therefore, the length and diameter of each unit may be enlarged to any desired degree to increase the treating capacity as needed.

In the operation of the apparatus, a plurality of the drums 12 are arranged in vertically stacked relation to one another with the smaller end of each vertically adjacent drum being disposed beneath the larger end of its next upwardly adjacent drum. Thus, each of the units may be utilized as a stage of the digesting operation with the exit 20 from one drum constituting the entrance to the next lower drum whereby the aeration, heat, speed of movement, agitation and rate of feed for each stage may be most effectively and efficiently controlled. Although only two drums are shown in vertically stacked relation in the drawings, at least three drums are contemplated in the ordinary operation of the device, one for the inoculation stage, one for the pasteurization stage and one for the drying stage. The number of drums would of course depend on the amount of material to be treated, the degree of treatment necessary and the character of the organic waste material being treated. To prevent the escape of waste gases from the lower drums to the upper drums, each combination exit-entrance duct 20 is provided with a one-way check valve in the form of a downwardly swinging baffle plate 72 having a portion projecting exteriorly of the conduit and being hinged as at 74 to the duct wall. Counterweight 76 is mounted on the exteriorly projecting portion of the plate 72 normally causing the plate to seal the conduit against the upward passage of gases therethrough. Upon passage of waste material downwardly through the duct 20, the weight of this material overcomes the counterbalancing weight and swings the plate open.

To assemble the plows within the drums, the shafts 22 are constructed in sections as shown in Figure 5. One end of each section is formed as a reduced cylindrical extension 62 while the other end is provided with a cylindrical bore 64 into which the extension 62 of the adjacent section fits. Transverse bores 66 and 68 opening respectively into diametrically opposite portions of the bore 64 and extension 62 respectively align with one another for the reception of shear pin 70 securing the sections to one another.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An organic waste digesting apparatus comprising a plurality of vertically stacked, horizontally disposed frustro-conical drums, vertically adjacent one of said drums being reversely positioned with respect to one another, each of said drums having a material entrance opening thereinto adjacent the smaller end thereof and a material exit opening thereinto adjacent the larger end thereof, the exit for one drum constituting the entrance for the next lower drum, a rotatable shaft extending axially through each of said drums, plows mounted on each shaft at spaced points therealong for agitating and lifting material within the drum while moving the material from the entrance to the exit, means for aerating the interior of each drum from both ends of the drum and means for exhausting gases and draining liquids from said drums at spaced intervals throughout the length of each drum.

References Cited in the file of this patent
UNITED STATES PATENTS

| | | |
|---|---|---|
| 603,612 | Snyder et al. | May 3, 1898 |
| 1,489,702 | Hare | Apr. 8, 1924 |
| 1,793,638 | Rowton et al. | Feb. 24, 1931 |
| 1,994,083 | Brown et al. | Mar. 12, 1935 |
| 2,022,761 | Fenby | Dec. 3, 1935 |
| 2,144,988 | Miller | Jan. 24, 1939 |
| 2,285,834 | Proctor | June 9, 1942 |
| 2,337,686 | Sherman | Dec. 28, 1943 |
| 2,374,425 | De Weerth | Apr. 24, 1945 |
| 2,576,995 | Carvel | Dec. 4, 1951 |
| 2,633,413 | Eweson | Mar. 31, 1953 |
| 2,695,218 | Eweson | Nov. 23, 1954 |